(12) United States Patent
Martin et al.

(10) Patent No.: US 8,044,850 B2
(45) Date of Patent: Oct. 25, 2011

(54) METHOD AND APPARATUS FOR DETERMINING THE POSITION AND ORIENTATION OF A MISSILE

(75) Inventors: Sven Martin, Munich (DE); Dieter Dragon, Aichach (DE)

(73) Assignee: Astrium GmbH, Munich (DE)

( * ) Notice: Subject to any disclaimer, the term of this patent is extended or adjusted under 35 U.S.C. 154(b) by 462 days.

(21) Appl. No.: 12/090,776

(22) PCT Filed: Oct. 11, 2006

(86) PCT No.: PCT/EP2006/009785
§ 371 (c)(1),
(2), (4) Date: Apr. 18, 2008

(87) PCT Pub. No.: WO2007/045381
PCT Pub. Date: Apr. 26, 2007

(65) Prior Publication Data
US 2008/0211718 A1  Sep. 4, 2008

(30) Foreign Application Priority Data

Oct. 20, 2005  (EP) .................................. 05022866

(51) Int. Cl.
*G01S 19/11* (2010.01)
*G01S 19/48* (2010.01)

(52) U.S. Cl. .............................. 342/357.48; 342/357.31

(58) Field of Classification Search ............. 342/357.06, 342/357.14, 357.48, 357.53, 357.31, 357.36
See application file for complete search history.

(56) References Cited

U.S. PATENT DOCUMENTS

| 5,208,756 | A | * | 5/1993 | Song | 342/457 |
|---|---|---|---|---|---|
| 5,359,521 | A | * | 10/1994 | Kyrtsos et al. | 342/357.3 |
| 5,701,328 | A | * | 12/1997 | Schuchman et al. | 342/457 |
| 5,708,440 | A | | 1/1998 | Trimble et al. | |
| 5,714,948 | A | * | 2/1998 | Farmakis et al. | 342/29 |
| 6,037,899 | A | * | 3/2000 | Weber | 342/357.36 |
| 6,535,801 | B1 | | 3/2003 | Geier et al. | |
| 6,876,325 | B1 | | 4/2005 | Coluzzi et al. | |
| 2002/0077731 | A1 | * | 6/2002 | Hilb | 701/4 |

FOREIGN PATENT DOCUMENTS

| EP | 0 936 516 A2 | 8/1999 |
|---|---|---|
| WO | WO 97/28455 A1 | 8/1997 |

OTHER PUBLICATIONS

B.W. Parkinson et al., Optimal Locations of Pseudolites for Differential GPS, Navigation: Journal of the Institute of Navigation, vol. 33(4), p. 259-283, Winter 1986-1987.*
Christian Altmayer, et al. "Autonomous Onboard Orbit and Attitude Control of Geostationary Satellites Using Pseudolites", The Institute of Navigation, Nashville, XP009062646, pp. 1565-1575, Sep. 1998.
Form PCT/ISA/220 and Form PCT/ISA/237 dated Feb. 2, 2007 with an English translation of the pertinent portions (Fourteen (14) pages).
International Search Report dated Feb. 2, 2007 with an English translation of the pertinent portions (Five (5) pages).

* cited by examiner

*Primary Examiner* — Thomas Tarcza
*Assistant Examiner* — Fred H Mull
(74) *Attorney, Agent, or Firm* — Crowell & Moring LLP

(57) ABSTRACT

A system for determining the position and orientation of a flying object such as a missile includes a ground segment having at least one pseudolite station located on the earth's surface which transmits into space a navigation signal that uniquely identifies the pseudolite station, and a user segment having at least one sensor which is situated in the missile and is designed to receive the navigation signal from the at least one pseudolite station and to determine its absolute position and orientation in space on the basis of the received navigation signal.

20 Claims, 4 Drawing Sheets

METHOD AND APPARATUS FOR DETERMINING THE POSITION AND ORIENTATION OF A MISSILE

CROSS REFERENCE TO RELATED APPLICATIONS

This application is a National Stage of International Application No. PCT/EP2006/009785, filed Oct. 11, 2006, which claims priority under 35 U.S.C. §119 to European Patent Application No. 05022866.7, filed Oct. 20, 2005, the entire disclosure of which is herein expressly incorporated by reference.

BACKGROUND AND SUMMARY OF THE INVENTION

The invention relates to a method and apparatus for determining the position and orientation of a missile, particularly a space missile.

Inertial navigation systems and sometimes supplementary sensor systems such as barometric sensors, are generally used to determine the position and orientation of spacecraft, including space missiles (such as booster rockets and their payloads), satellites, and other exo- and transatmospheric flying devices. "Orientation" refers to the location/orientation of the space missile in space, t.e., the angles of roll, pitch, and yaw. Although such systems are independent of external devices, and in particular to external signals, they entail high costs. In addition, they do not provide information concerning the absolute position of a space missile.

In U.S. Pat. No. 6,535,801 B1, the absolute position and orientation of a satellite in a geosynchronous orbit are determined using global positioning system (GPS) signals. Because GPS satellites are oriented such that their principal direction of radiation for GPS signals is pointed toward the earth, in geosynchronous orbits (which are situated above the orbits of GPS satellites) on average only one GPS signal (or even none at all, but no more than three GPS signals) is received, which is generally insufficient for a reliable determination of the absolute position and orientation of a geosynchronous satellite. It was therefore proposed to process GPS signals transmitted by the GPS satellites in secondary directions of radiation as well; however, these signals are very noisy.

According to U.S. Pat. No. 6,535,801, such processing may be enabled, for example, by using a pseudolite stationed on the earth, the signal from which is continuously received by the geosynchronous satellite and used for a highly accurate GPS time standard in the receiver of the geosynchronous satellite. A disadvantage of this method, however, is that the GPS satellites signals which are used are under the control of the United States Department of Defense, and therefore may be switched off or become degraded at any time.

One object of the present invention is to provide a system and a method for determining the position of a missile, in particular a space missile, which enables the absolute position to be determined and which is as independent as possible from GPS signals.

This and other objects and advantages are achieved by the method and apparatus according to the invention, in which at least one pseudolite (short for "pseudosatellite") station on the earth's surface transmits a navigation signal into space (i.e., the near-earth space outside the earth's atmosphere and also interplanetary space and space navigable by space missiles) which uniquely identifies the station. The navigation signal transmitted by the psetidolite station may then be received by a missile (for example a rocket) and used to determine the absolute position of the missile, either i) solely on the basis of received navigation signals from multiple pseudolite stations, ii) in interaction with inertial navigation systems that are present, or iii) with other navigation signals from satellites. By use of such a pseudolite station the above-described disadvantages of position determination by means of satellites may be largely avoided, in particular problems in reception of navigation signals at altitudes greater than the orbits of navigation satellites.

Heretofore, pseudolite stations have been used to improve navigational accuracy on the earth's surface, and have therefore transmitted their navigation signals only in the region of the earth's surface, to enable optimal reception by navigation signal receivers on the earth's surface or in the vicinity thereof. Transmitting a navigation signal from a pseudolite station into space according to the present invention provides the possibility for determining the absolute position of missiles also at very high altitudes, in particular for space missiles such as rockets, or also geosynchronous satellites.

The invention may be used alone or in addition to inertial navigation systems present in missiles to enable a particularly accurate and, above all, an absolute determination of the missile's position and orientation. For example, operators of rocket launching pads may utilize the invention to be independent from operators of satellite navigation systems and to maintain complete control over the system for determining the absolute position and orientation of rockets. The invention is suitable for any type of missile, in particular for applications in which conventional navigation systems such as GPS or the Global Navigation Satellite System (GLONASS or GNSS) are too imprecise, are unsuitable due to high flight altitude, or are too unreliable. Lastly, the invention may also be implemented in missiles more economically than is the case for current avionics for position and orientation determination.

According to one embodiment, the invention relates to a system for determining the position of a missile, in particular a space missile, comprising a ground segment having at least one pseudolite station which is located on the earth's surface and which transmits a navigation signal into space which uniquely identifies the pseudolite station, and a user segment having at least one sensor, situated in the missile, which is designed to receive the navigation signal of the at least one pseudolite station and to determine its absolute position in space on the basis of the received navigation signal. By use of such a system, the position of a missile may be determined largely independently of satellite navigation systems, but at a minimum the accuracy of the position determination may be significantly improved by use of satellite navigation signals. The system may also be used as a fall-back solution for the position determination, for example if an inertial navigation system of a missile fails, or satellite-based navigation is unusable due to poor reception of navigation signals.

To increase the accuracy of the position determination and in particular to enable the most accurate position determination possible at various altitudes of the missile and flight phases, the ground segment may include multiple pseudolite stations which are configured on the earth's surface according to a specified geometry, in such a way that navigation signals from at least five different pseudolite stations may be received during all phases of flight of the missile. In this manner the position may be determined with an accuracy that is sufficient in particular for critical missions such as launching and flight of a booster rocket for satellites, and which is more reliable, at least in part, than position determination based on satellite navigation signals.

Because particularly high accuracy is required for the position determination, above all in critical flight phases such as the launch, the pseudolite stations may also be configured in such a way that navigation signals may be received from a maximum number of pseudolite stations during the launch of the missile from the earth's surface. For example, multiple pseudolite stations may be provided at short distances from one another in the region of a rocket launching pad so that there is a high probability that a launching booster rocket will receive navigation signals from a large number of pseudolite stations and is able to determine its absolute position in space with a high degree of accuracy.

According to a further embodiment, the invention relates to a pseudolite station for use in a system according to the invention, wherein the psuedolite station comprises a signal generator which generates a navigation signal that uniquely identifies the pseudolite station, and transmits the navigation signal via a code multiplexing process, and a transmitter antenna for transmitting the code multiplexing signal, which signal generator uses a code uniquely associated with the pseudolite station as a spreading code.

In principle, a pseudolite station may have a design that is similar to a navigation satellite, except that it occupies a fixed, specified position on the earth's surface and transmits its navigation signals into space, not to the earth's surface as is the case with a satellite.

In particular, a control and monitoring unit may be provided which is designed to control the generation of navigation signals and to monitor the transmission of navigation signals in coordination with data for a time standard.

To ensure that multiple pseudolite stations transmit their navigation signals based on the most synchronous time standard possible, a monitor station for monitoring the pseudolite station may be provided to receive navigation signals from satellites, and to generate synchronization signals for the control and monitoring unit of the pseudolite station from the received navigation signals. Due to the curvature of the earth, however, centralized synchronization of the pseudolite station is difficult if not impossible. It is therefore advantageous to synchronize satellite navigation signals so that the signals may be easily received by the pseudolite stations.

The monitor station may be designed in particular to extract time information from navigation signals received from satellites, and to use this information to generate synchronization signals. In other words, the monitor station of a pseudolite station may make use of external satellite navigation signals as a time standard.

Alternatively or additionally, the monitor station may be designed to obtain time information by means of a two-way time transfer process, and to use this information to generate synchronization signals.

A pseudolite station may also have a high-stability oscillator reference as a local time standard, by means of which to a certain extent the pseudolite station may operate autonomously; that is, in particular, independently of external signals such as satellite navigation signals.

According to a further embodiment, the invention relates to a sensor for use in a system according to the invention, which sensor comprises at least one antenna and at least one receiver for receiving a navigation signal from at least one pseudolite station, and processing and computation means for processing the received navigation signal and computing the absolute position and orientation of the sensor from the processed navigation signal. Such a sensor may be, for example, a unit which may be installed in various missiles (for example booster rockets and their payloads, satellites, and other exo- and transatmospheric flying devices), to allow the absolute position of the missile to be determined according to the invention.

The at least one antenna and the at least one receiver may also be designed to receive navigation signals from satellites. In this manner the accuracy of the position determination may be further improved, or sometimes even increased. Received satellite navigation signals may, for example, be entered directly into the position determination, or may also be used to check the plausibility of a position which has already been determined on the basis of the navigation signals from pseudolite stations.

A further improvement in the position determination may be achieved by providing the processing and computation means to process data from an inertial navigation system of a missile, and to take the data from the inertial navigation system into account in computing the absolute position and orientation of the sensor from the processed navigation signals. In this regard, an inertial navigation system is understood to mean all components which are used for determining the relative position of a missile, i.e., also position sensors and barometric sensors, for example.

The processing and computation means in particular have a digital signal processor which is programmed to reconstruct and decode navigation signal data from the received navigation signals.

In one preferred embodiment, the processing and computation means also has a central processing unit which is programmed to compute the absolute position and orientation of the sensor from the navigation signal data generated by the digital signal processor, taking into account the position data from at least one pseudolite station. In this case the algorithms, which are used for position determination and in principle correspond to the algorithms for position determination using satellite navigation signals, are essentially implemented in software which is run by the central processing unit. However, the algorithms may also be implemented in hardware in order to achieve, for example, the most rapid position determination possible.

The processing and computation means may also have a data memory in which position data from at least one pseudolite station together with the unique code for the pseudolite station are stored. The central processing unit is then programmed in such a way that it is able to read from the data memory the position data associated with the pseudolite station on the basis of navigation signal data from a pseudolite station, and to compute the absolute position and orientation of the sensor. In this case it is not necessary, in principle, for the pseudolite stations to transmit position data in their navigation signals. In principle, the unique code for a given pseudolite station is sufficient to determine in the sensor the positions of the pseudolite station on the basis of the information stored in the data memory, and to use this information for the position determination. However, if the position data are transmitted with the navigation signals, for poor or faulty signal reception, for example, in which only the pseudolite station transmitting the signal can be ascertained, position determination is still performed, since the corresponding position data from the pseudolite station are locally present in the sensor.

Lastly, according to one embodiment the invention relates to a method for determining the position of a missile, in particular a space missile, wherein at least one pseudolite station of a ground segment which is located on the earth's surface transmits a navigation signal into space which uniquely identifies the pseudolite station, and at least one sensor for a user segment, provided in the missile, receives the navigation signal from the at least one pseudolite station and determines its absolute position in space on the basis of the received navigation signal.

In determining its absolute position in space, the sensor may also use at least one navigation signal from a satellite.

In determining its absolute position in space, the sensor may also use additional data from an inertial navigation system for the missile.

Other objects, advantages and novel features of the present invention will become apparent from the following detailed description of the invention when considered in conjunction with the accompanying drawings.

DETAILED DESCRIPTION OF THE DRAWINGS

Figure 1:
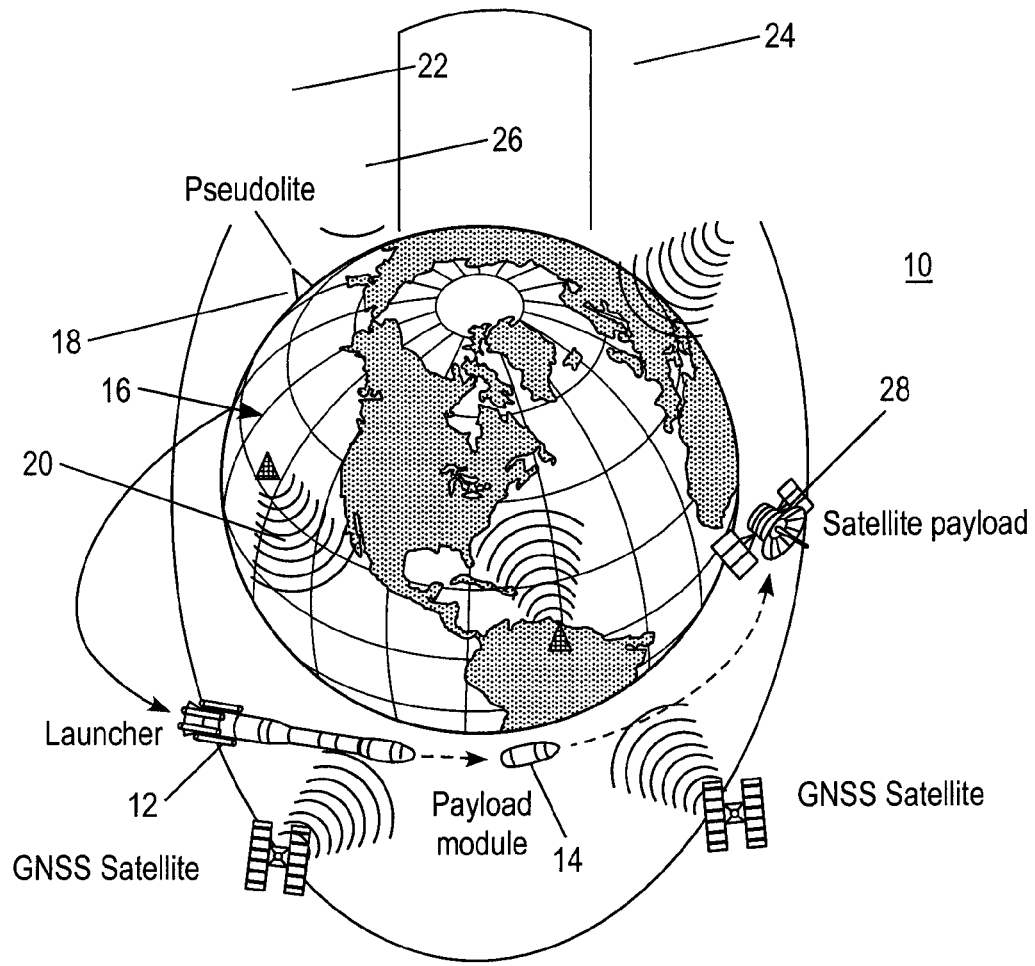
FIG. 1 is a schematic perspective view of an exemplary embodiment of a system according to the invention for determining the position and orientation of a booster rocket and its payload.

Identical and/or functionally equivalent elements may be provided below with the same reference numerals.

Figure 2:
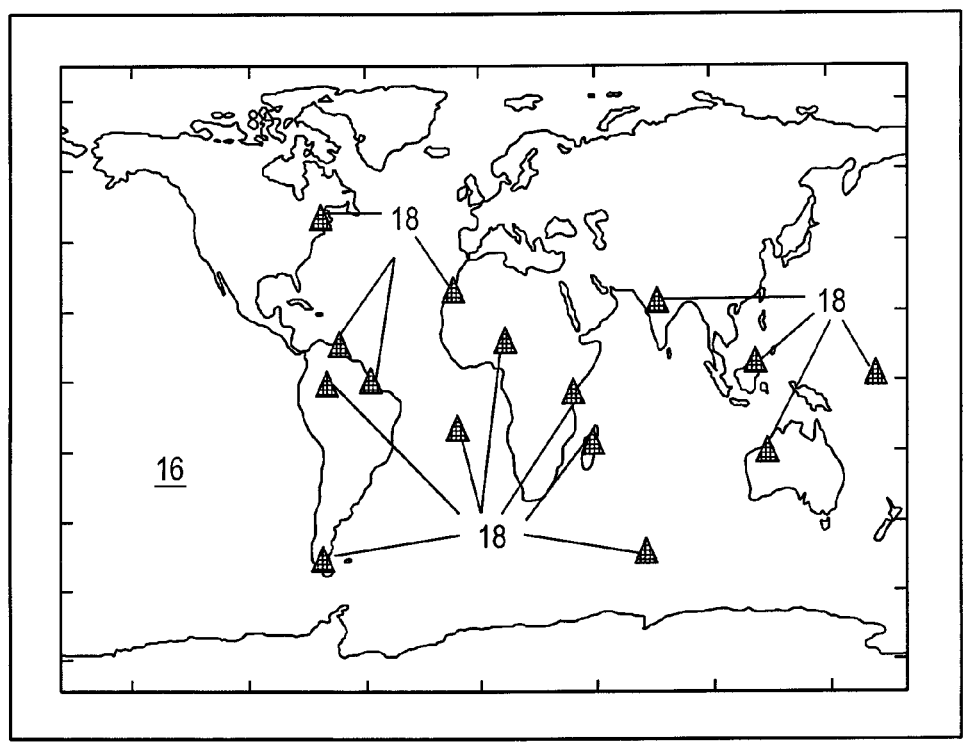
FIG. 2 shows an exemplary embodiment of a geographical distribution of pseudolite stations on the earth according to the invention.

FIG. 1 shows a system 10 for determining the position and orientation of a booster rocket 12 and its payload 14, the system including a ground segment 16 having multiple pseudolite stations 18 situated at various geographical locations on the earth's surface (FIG. 2). Each pseudolite station 18 transmits a navigation signal 20 (SIS: signal in space) into space which uniquely identifies the station. Also illustrated in FIG. 1 are multiple GNSS satellites 22 which orbit the earth in a satellite orbit 24 at an altitude of approximately 20,000 km and transmit navigation signals 26, as is customary in navigation systems.

The position and orientation, in particular the altitude, of a booster rocket 12 launched from the earth, its payload module 14, and satellite payload 28 may be determined on the basis of the navigation signals 20 from the pseudolite station 18, and optionally also from the navigation signals 26 from the GNSS satellites 22. The booster rocket 12, its payload module 14, and satellite payload 28 form a space segment of the system 10, and have onboard receivers (not illustrated) for the various navigation signals 20 and 26, and onboard evaluation devices (likewise not illustrated) for received navigation signals. The receivers and evaluation devices may have designs that are similar to those of known satellite navigation devices, which are able to determine the position of an object in space on the basis of navigation signals. The position and orientation determination is not limited to a booster rocket and its payload; it may be used for any missile, in particular for ballistic missiles and exo- and transatmospheric missiles such as ultra-high-altitude missiles.

To determine the position and orientation of a missile, it may be sufficient to evaluate only the navigation signals 20 from the pseudolite stations 18. In that case, however, the navigation signals 20 from the pseudolite stations 18 are used for position and orientation determination when the navigation signals 26 from the GNSS satellites 22, which are radiated toward the earth, are received poorly (or not at all) by the missile, or when too few navigation signals 26 are received from the GNSS satellites 22. The position and orientation data determined on the basis of the navigation signals 20 and possibly 26 may also be combined with the position and orientation data determined by an inertial navigation system of the missile, for example for mutual plausibility checks of the determined data, or for improving the accuracy. In addition, the navigation signals 20 may be of use independently of the installation in order to improve the satellite geometry, resulting in a better dilution of precision (DOP) value and, ultimately, a more accurate position determination.

The structure of the navigation signals 20 from the pseudolite stations 18 is similar to that of the navigation signals 26 from the GNSS satellites 22, and includes the transmission time and the exact spatial coordinates of a transmitting pseudolite station 18. The pseudolite stations 18 transmit the navigation signals 20 via code division multiple access (CDMA). For this purpose the signals to be transmitted are spread by use of a (spreading) code, in particular a Gold or Gold-like code, over the frequency band that is available for transmission. The navigation signals 20 from the pseudolite stations 18 may therefore also be transmitted in the same frequency bands in which the navigation signals 26 from the GNSS satellites 22 are transmitted. The navigation signals are then differentiated in the receiver by use of the (spreading) code necessary for decoding. By increasing the data transmission rate from the pseudolite stations 18, it is also possible to transmit differential correction data in the transmitted navigation signals 20, so that no additional data connections are necessary for these correction data.

FIG. 2 illustrates a distribution or configuration of pseudolite stations 18 in one exemplary embodiment of a ground segment 16 on the earth's surface, which is particularly suitable for determining the position and orientation of booster rockets and their payloads, as shown in FIG. 1. The stations 18 are distributed over the earth's surface in such a way that the position and orientation of a booster rocket may be determined at any time, either solely on the basis of the navigation signals transmitted by the pseudolite stations 18, or in combination with satellite navigation signals from GNSS or GPS. Most of the stations 18 are situated in the vicinity of the equator, which ensures optimal reception of the navigation signals, transmitted by the stations 18, in a booster rocket and its payload.

The design of one exemplary embodiment of a pseudolite station and a sensor according to the invention are discussed in greater detail below.

As described above, the system for position and orientation determination according to the invention comprises a ground segment, having one or more pseudolite stations, and a user segment (onboard the missiles) having receivers and evaluation devices for navigation signals.

Figure 3:
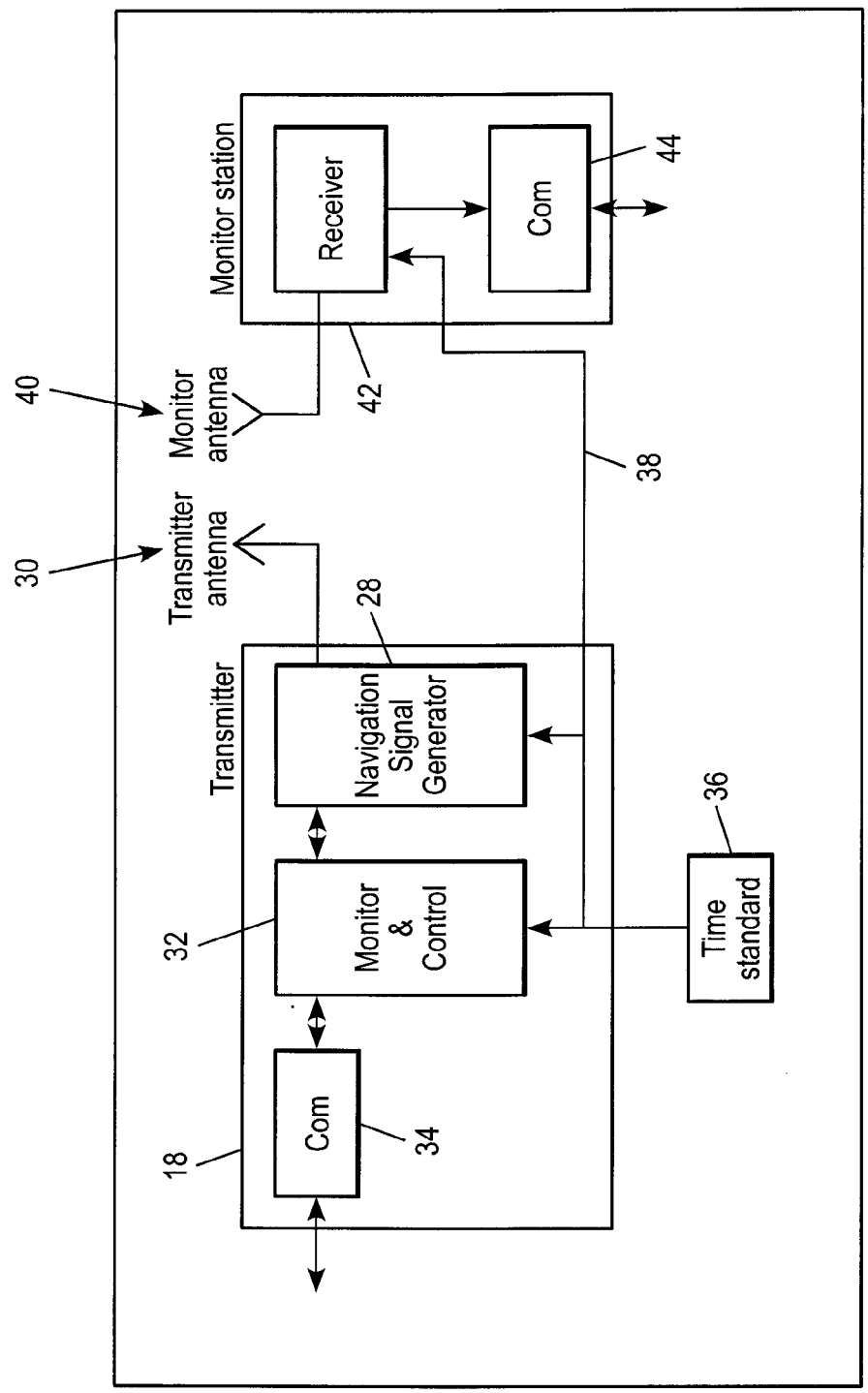
FIG. 3 is a block diagram of one exemplary embodiment of a pseudolite station according to the invention.

A typical design of a pseudolite station 18 of the ground segment is illustrated in FIG. 3. The core of the station 18 is the navigation signal generator 28, which generates navigation signals that are transmitted via a transmitter antenna 30 for the pseudolite station 18. Also provided are pseudolite communications hardware and software for control and monitoring in the form of a control and monitoring unit 32, and a communications unit 34.

The navigation signal generator 28 is designed to generate GNSS-like signals which are transmitted via CDMA over the transmitter antenna 30. Each pseudolite station 18 transmits a characteristic code sequence which uniquely identifies the station and is used as a spreading code for CDMA. The transmission of the navigation signals is controlled and monitored by the control and monitoring unit 32, which actuates the navigation signal generator 28 for transmission of navigation signals.

The transmitted navigation signals contain the exact time of the transmission and the position of a pseudolite station 18 in the form of coordinates which indicate the precise position of the transmitter antenna 30. For this reason it is necessary to determine the exact position of the transmitter antenna, and to indicate this position either in a local or a global reference system.

Because the curvature of the earth prevents simultaneous monitoring of all pseudolite stations 18 by a single centralized master and monitor station, each pseudolite station 18 is monitored by its own monitoring station 38, which includes a monitor antenna 40 and a receiver 42 by means of which the monitoring station is able to receive navigation signals from GNSS satellites. The monitoring station also has a communications unit 44 which is able to communicate with the communications unit 34 of the pseudolite station 18. The monitoring stations 38 of all the pseudolite stations 18 are synchronized with one another, since in particular they generate the time standard for each pseudolite station 18. Such synchronization may be achieved, for example, by use of GNSS (common view) or by two-way time transfer processes, which requires the monitor antenna 40 and receiver 42. Each pseudolite station 18 is also provided with a high-stability reference oscillator which forms a local time standard 36.

The accuracy of the position and orientation of a missile, determined according to the invention, also depends on the geometry of visible pseudolite stations 18. In this context, geometry is understood in particular to refer to the spatial distribution and geographical configuration of pseudolite stations 18. The geometry of the stations 18 is optimal when the stations are at a maximum distance from one another. A typical geometry of pseudolite stations 18 is illustrated in FIG. 2. The geographical distribution of the pseudolite stations 18 is selected such that navigation signals from at least five pseudolite stations 18 may be received during each flight phase of an object in flight. The pseudolite stations 18 are preferably configured in such a way that the object in flight is able to receive a maximum number of navigation signals from the pseudolite stations 18 during critical maneuvers such as launching a booster rocket and releasing the payload. For example, to this end the number and density of pseudolite stations 18 may be increased in the vicinity of the launching pad for the booster rocket.

The user segment onboard an object in flight, for example in a booster rocket and in its payload, is essentially formed by a type of position and orientation sensor which comprises the following subsystems:

An individual reception antenna or a multi-antenna array (the antenna array for the position determination generally includes two or four antennas) for receiving the wireless navigation signals from GNSS satellites and pseudolite stations;

A receiver for receiving the navigation signals from GNSS satellites and pseudolite stations; and A central processing unit (CPU) for running a program for computing the position based on the time and spatial coordinate data contained in the received navigation signals, and the position based on code and phase measurements of the navigation signals for position determination received via the antenna.

Figure 4:
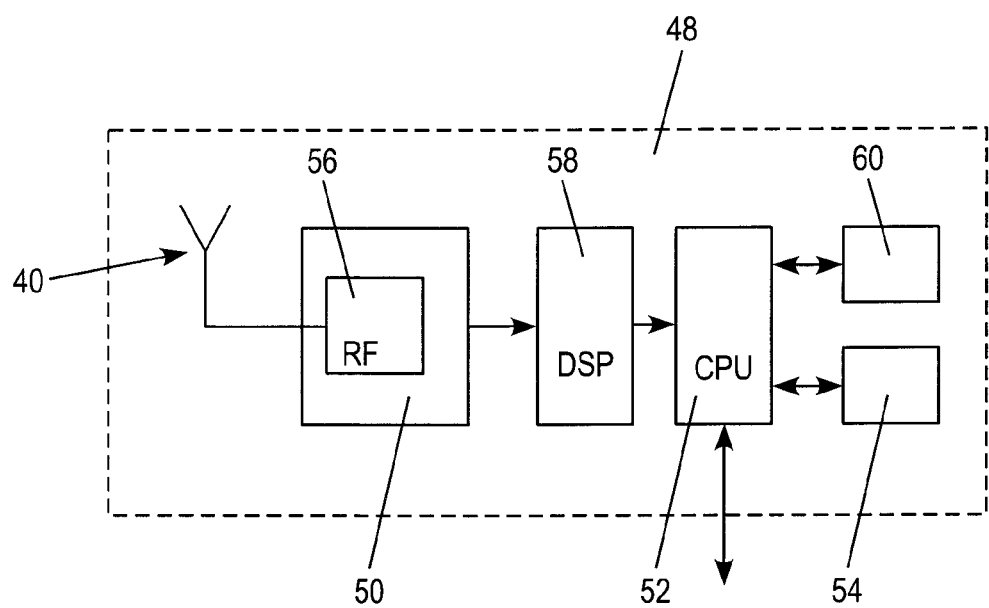
FIG. 4 is a block diagram of one exemplary embodiment of a position and orientation sensor for the user segment of the system according to the invention for determining the position of an object in flight.

FIG. 4 shows a sensor 46 for the user segment, having the above-mentioned units: antenna 48, receiver 50, CPU 52, and a program memory 54 in which the program for position and orientation determination is stored.

The signals received by the antenna 48 are fed via a high-frequency (HF) front end 56 of the receiver 50 to a digital signal processor (DSP) 58, which reconstructs and decodes the navigation signal data from the received signal. The output from the DSP 58, which also includes the code and phase measurements, is fed to the CPU 52, which computes the orientation and position based on the data from the received GNSS or pseudolite navigation signals.

In addition, the ephemerides of the GNSS satellites and the positions of the pseudolite stations may be stored in a data memory 60 in the position and orientation sensor 46. In that case it is not necessary for the pseudolite stations to transmit their position data together with the navigation signal. However, if the data memory 60 in the sensor 46 is dispensed with, the position data contained in the navigation signals from the pseudolite stations are necessary for the position determination.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMERALS

10 System for position and orientation determination for a booster rocket and its payload
12 Booster rocket
14 Payload
16 Ground segment
18 Pseudolite stations of the ground segment 16
20 Navigation signal from a pseudolite station 18
22 GNSS satellite
24 GNSS satellite path in orbit
26 Navigation signal from a GNSS satellite 22
28 Navigation signal generator for a pseudolite station 18
30 Transmitter antenna for a pseudolite station
32 Control and monitoring unit for a pseudolite station 18
34 Communications unit for a pseudolite station 18
36 Time standard for a pseudolite station 18
38 Monitor station
40 Monitor antenna
42 Receiver for the monitor station 38
44 Communications unit for the monitor station 38
46 Position and orientation sensor for the user segment
48 Antenna
50 Receiver
52 CPU
54 Program memory
56 HF front end
58 DSP
60 Data memory

The invention claimed is:

1. A system for determining the position and orientation of a flying object, said system comprising:
   a ground segment having at least one pseudolite station which is located on the earth's surface and transmits a navigation signal into space, which navigation signal uniquely identifies the pseudolite station; and
   a user segment having at least one sensor which is situated in the object and is designed to receive the navigation signal from the at least one pseudolite station and to determine its absolute position and orientation in space on the basis of the received navigation signal, wherein the ground segment comprises multiple pseudolite stations, the ground segment is configured on the earth's surface according to a specified geometry, such that navigation signals from at least five different pseudolite stations are received during all phases of flight of the object, and the pseudolite stations are configured in such a way that a maximum number of navigation signals that can be received by the sensor are received from the pseudolite stations during the launch of the object from the earth's surface.

2. A pseudolite station for use in a system according to claim 1, said pseudolite station comprising:

a signal generator which generates a navigation signal that uniquely identifies the pseudolite station, and transmits the navigation signal as a code multiplexing signal via a code multiplexing process; and a transmitter antenna for transmitting the code multiplexing signal;

wherein, the signal generator uses a code uniquely associated with the pseudolite station as a spreading code.

3. The pseudolite station according to claim 2, further comprising a control and monitoring unit which controls generation of navigation signals, and monitors transmission of navigation signals in coordination with data for a time standard.

4. The pseudolite station according to claim 3, further comprising a monitor station for monitoring the pseudolite station, which monitor station is configured to receive navigation signals from satellites, and generate synchronization signals for the control and monitoring unit of the pseudolite station from the received navigation signals.

5. The pseudolite station according to claim 4, wherein the monitor station is configured to extract time information from navigation signals received from satellites, and to use said time information to generate synchronization signals.

6. The pseudolite station according to claim 4, wherein the monitor station is configured to obtain time information via a two-way time transfer process, and to use said time information to generate synchronization signals.

7. The pseudolite station according to claim 2, further comprising a high-stability oscillator reference as a local time standard.

8. The sensor for use in a system according to claim 1, said sensor comprising:

at least one antenna and at least one receiver for receiving a navigation signal from at least one pseudolite station; and processing and computation means for processing the received navigation signal and computing absolute position and orientation of the sensor from the processed navigation signal.

9. The sensor according to claim 8, wherein the at least one antenna and the at least one receiver are also configured to receive navigation signals from satellites.

10. The sensor according to claim 8, wherein the processing and computation means are also configured to process data from an inertial navigation system of an object, and to take the data from the inertial navigation system into account in computing the absolute position and orientation of the sensor from the processed navigation signals.

11. The sensor according to claim 8, wherein the processing and computation means have a digital signal processor which is programmed to reconstruct and decode navigation signal data from received navigation signals.

12. The sensor according to claim 11, wherein the processing and computation means also have a central processing unit which is programmed to compute the absolute position and orientation of the sensor from the navigation signal data generated by the digital signal processor, taking into account the position data from at least one pseudolite station.

13. The sensor according to claim 12, wherein:

the processing and computation means also have a data memory in which position data from at least one pseudolite station together with the unique code for the pseudolite station are stored; and the central processing unit is programmed to read from the data memory the position data associated with the pseudolite station on the basis of navigation signal data from a pseudolite station, and to compute the absolute position and orientation of the sensor.

14. The system according to claim 1, wherein the user segment is configured to perform a plausibility check of the absolute position determined by the sensor, based on a satellite navigation signal received by the user segment.

15. The system according to claim 1, wherein the pseudolite stations transmit differential correction data in the navigation signals.

16. A method for determining the position of a flying object, said method comprising:

at least one pseudolite station of a ground segment which is located on the earth's surface transmitting a navigation signal into space, which navigation signal uniquely identifies the pseudolite station; and at least one sensor for a user segment, provided in the object, receiving the navigation signal from the at least one pseudolite station, and determining absolute position of the sensor in space based on the received navigation signal, wherein the ground segment comprises multiple pseudolite stations, the ground segment is configured on the earth's surface according to a specified geometry, such that navigation signals from at least five different pseudolite stations are received during all phases of flight of the object, and the pseudolite stations are configured in such a way that a maximum number of navigation signals that can be received by the sensor are received from the pseudolite stations during the launch of the object from the earth's surface.

17. The method according to claim 16, wherein, in determining said absolute position in space, the sensor also uses at least one navigation signal from a satellite.

18. The method according to claim 16, wherein in determining said absolute position in space, the sensor also uses additional data from an inertial navigation system of the object.

19. The method according to claim 16, wherein the user segment is configured to perform a plausibility check of the absolute position determined by the sensor, based on a satellite navigation signal received by the user segment.

20. The method according to claim 16, wherein the pseudolite stations transmit differential correction data in the navigation signals.

* * * * *